US011477312B2

(12) United States Patent
Bohn

(10) Patent No.: US 11,477,312 B2
(45) Date of Patent: Oct. 18, 2022

(54) MOBILE PHONE COVER PROVIDING PASSIVE NOISE REDUCTION OF MICROPHONE AUDIO INPUT SIGNALS

(71) Applicant: Furtune AS, Oslo (NO)

(72) Inventor: Mads Bohn, Oslo (NO)

(73) Assignee: FURTUNE AS, Oslo (NO)

( * ) Notice: Subject to any disclaimer, the term of this patent is extended or adjusted under 35 U.S.C. 154(b) by 0 days.

(21) Appl. No.: 17/050,331

(22) PCT Filed: Apr. 24, 2019

(86) PCT No.: PCT/NO2019/050091
§ 371 (c)(1),
(2) Date: Oct. 23, 2020

(87) PCT Pub. No.: WO2019/209117
PCT Pub. Date: Oct. 31, 2019

(65) Prior Publication Data
US 2021/0136190 A1 May 6, 2021

(30) Foreign Application Priority Data
Apr. 27, 2018 (NO) .................................. 20180603

(51) Int. Cl.
*H04M 1/03* (2006.01)
*H04B 1/3888* (2015.01)
(Continued)

(52) U.S. Cl.
CPC .......... *H04M 1/035* (2013.01); *H04B 1/3888* (2013.01); *H04R 1/2876* (2013.01);
(Continued)

(58) Field of Classification Search
CPC ..... H04M 1/035; H04B 1/3888; H04R 1/342; H04R 1/2876; H04R 2410/07; H04R 2499/11
See application file for complete search history.

(56) References Cited

U.S. PATENT DOCUMENTS

| 2012/0177239 A1* | 7/2012 | Lee ........................ H04R 1/086 381/359 |
| 2013/0045782 A1* | 2/2013 | Simmer ................ H04M 1/035 455/575.8 |

(Continued)

FOREIGN PATENT DOCUMENTS

JP          H119321 A   *  1/1999

OTHER PUBLICATIONS

Dag Glebe: "Measurement of wind noise levels on a headset with and without a wind noise reduction unit", Jan. 17, 2017 (Jan. 17, 2017), XP055610305, Retrieved from the Internet: URL:http://thexpuff.com/wp-content/uploads/2017/01/Report-from-SP-the-technical-rese arch-institute-of-Sweden.pdf [retrieved on Aug. 1, 2019] cited in the application table 1 p. 4.

(Continued)

*Primary Examiner* — Yuwen Pan
*Assistant Examiner* — Angelica M Perez
(74) *Attorney, Agent, or Firm* — Wissing Miller LLP

(57) ABSTRACT

The present disclosure is related to a mobile phone cover providing passive noise reduction of at least one microphone audio input signal, comprising a supporting frame (13). The supporting frame (13) is arranged with an extension element with a compartment (15) facing upwards with a partly open surface on a same side as a display surface of the mobile phone, the compartment (15) is adapted to support a porous body (17) providing the passive noise reduction.

19 Claims, 15 Drawing Sheets

(51) Int. Cl.
  *H04R 1/28*   (2006.01)
  *H04R 1/34*   (2006.01)
(52) U.S. Cl.
  CPC ......... *H04R 1/342* (2013.01); *H04R 2410/07* (2013.01); *H04R 2499/11* (2013.01)

(56) References Cited

U.S. PATENT DOCUMENTS

| | | | | |
|---|---|---|---|---|
| 2013/0170686 A1* | 7/2013 | Lester, Jr. | ............... | H04R 3/007 |
| | | | | 381/338 |
| 2013/0271902 A1* | 10/2013 | Lai | ....................... | H05K 5/0086 |
| | | | | 361/679.01 |
| 2014/0287802 A1* | 9/2014 | Walker | ................... | H04R 1/086 |
| | | | | 455/575.1 |
| 2015/0111623 A1* | 4/2015 | Hegemier | ............... | B44C 1/105 |
| | | | | 455/575.1 |
| 2016/0006474 A1 | 1/2016 | Zhang | | |

OTHER PUBLICATIONS

International Search Report and Written Opinion mailed in PCT/NG2019/050091 dated Aug. 12, 2019 (10 pages).
English translation of Office Action mailed in Eurasian Application 202092486 dated Sep. 23, 2021 (2 pages).

* cited by examiner

MOBILE PHONE COVER PROVIDING PASSIVE NOISE REDUCTION OF MICROPHONE AUDIO INPUT SIGNALS

CROSS-REFERENCE TO RELATED APPLICATIONS

This application is a 371 of PCT/NO2019/050091 filed on Apr. 24, 2019, published on Oct. 31, 2019 under publication number WO 2019/209117, which claims priority benefits from Norwegian Patent Application No. 20180603 filed Apr. 27, 2018, the disclosure of each is incorporated herein in their entirety by reference.

TECHNICAL FIELD

The present invention is related to mobile phone covers providing passive noise reduction of wind induced noise in microphones of mobile phones.

BACKGROUND

Microphones integrated in mobile phones are usually arranged on surfaces of the mobile phone housing. The number of microphones, location of respective microphones varies from one phone to another, even on different phone models from the same manufacturer. For example, microphones may be arranged on side surfaces of the mobile phone housing, or near edges of a front surface comprising a display, or on a backside surface, usually associated with a camera and camera lens located on the backside of the mobile phone housing.

The reason using different respective locations can be improvement of the sound recording quality, or added or improved technical performance of the phone etc. between respective models, or just design considerations. For example, noise from the surrounding environment at a location wherein a mobile phone is used may make a phone conversation difficult to hear or understand. Therefore, active noise reduction (ANR) and/or passive noise reduction (PNR) is common features of modern mobile phones. ANR systems creates for example an electric signal in anti-phase with the noise and/or ambient sound signal received by the phone thereby electronics inside the mobile phone is cancelling the ambient sound and/or noise signal(s) from the speech and/or music signals, i.e. audio signals as known in prior art.

PNR systems uses passive elements like some form of shielding of microphones reducing or dampening the influence of ambient noise or sound.

ANR systems may comprise at least two microphones, wherein a first microphone is used to receive noise (i.e. ambient sound) from the surrounding area of the mobile phone, which is communicated to an ANR system generating the antiphase signal while the other microphone is used to receive for example the voice of a human using the mobile phone. It is clear that different purposes of microphones may dictate the location of a microphone on the housing of the mobile phone. For example a microphone dedicated to receive human speech when making a phone call preferably should be arranged on a location providing good audio signal contact with the soundwaves originating from the human speaker. The obvious location is close to the mouth of the person using the mobile phone.

Recording audio signals when making a video with a smart phone requires that a microphone should be able to receive audio signals from the motive being recorded. A common position is on a backside of the phone housing close to the lens of the mobile phone camera. ANR systems and auto-gain amplifiers can record audio with good quality as known in prior art.

It is also common to have microphones in earpieces or headsets connected to the mobile phone. Such microphones may for example receive soundwaves from speech propagating through the bones (scull) of the user using the mobile phone, and/or may be used to record noise (i.e. audible sound) from the surrounding environment at the location of the user, which may be used as input to an active noise reduction system.

Another reason why more than one microphone is distributed around the mobile phone housing, is the ability to detect directions to respective sound sources as known in prior art. Based on this detection, a control algorithm running in the mobile phone detecting the direction may lower the amplification of some microphones while others may have increased amplification. The result is that the microphone closest to the sound source of interest may have an increased amplification while the amplification of the other microphones are reduced.

However, a microphone used to record ambient noise or sound should still be able to receive signals providing a proper antiphase signal if an anti-noise reduction system is in use.

The iPhone 7™ from Apple™ has for example four microphones. Two of them are located on each side of the Lightning port (power and external communication port of the phone). Another microphone is located on the backside of the iPhone 7™ between the camera and the LED based flashlight. The fourth microphone is located inside the iPhone™ earpiece.

Respective microphones of the iPhone 7™ provides active noise cancelation, which reduces ambient sound and/or noise. Another function is to detect a direction to a sound source, wherein one of the microphones providing the best sound recording quality is picked, for example when recording a video. In an iPhone 7™, this would be the microphone located on the backside of the mobile phone housing as discussed above.

If a mobile phone can record stereo sound, at least two microphones should be selected.

Even though active noise cancelation is widely used in various sound systems like mobile phones, wind as a source of noise is still a problem for active noise reductions systems. One reason behind this problem is related to how microphones detect sound waves.

It is usually a membrane or diaphragm that is moved by the impact of arriving sound waves hitting the membrane or diaphragm in the microphone, which is then detected for example by adapted electronic circuits converting movement in and out of the membrane or diaphragm into electrical signals representing an electric signal replica of the sound waves.

However, wind blowing towards a membrane or diaphragm of a microphone tends to create vertical vertices localized just in front of the membrane or the diaphragm. These locally induced vertical vertices provides a local change in pressure in front of the membrane or diaphragm, which can move the membrane or diaphragm back and forth and thereby induce "sound waves" that are detected and converted into electric signals looking like audible sound usually heard as a sort of "rumbling noise". Therefore, the wind-noise is not correlated with sound or noise from a source in the surrounding environment detected or received by a microphone, which is intended to be input to an active noise reduction system when cancelling noise.

Due to the physical nature of "wind induced noise" active noise reduction systems will seldom work properly when cancelling wind induced noise since there might be no correlation between wind induces noise in the microphone connected to the ARN system and a microphone receiving sound waves from a user of the phone.

The wind-noise phenomena is well known for example in the television industry. TV journalists interviewing people outside in the free air uses a passive wind-noise cancelation technique comprising "dressing" the microphone they use with a fur like hood, for example. Another common material is to "dress" the microphone with a foam rubber, or a sponge like material. The porous nature of these materials allows sound waves to pass through to the microphone membrane or diaphragm while the wind induced vertices may be created on the outside of the protective material, thereby the local induced vertices are moved away from the close vicinity of the membrane or diaphragm surface, and their possible impact is reduced. The porous material tends also to split incoming wind like a breakwater arrangement reducing the impact of the wind onto the membrane or diaphragm.

The same wind-noise phenomena is also a possible problem when using a mobile phone outside in the free air, when making normal phone calls, or when recording videos with a mobile phone camera. Dependent on the location of the microphones on the mobile phone housing, the wind-noise phenomena may be more dominant in some of the microphones than others located on the mobile phone housing.

Therefore, even in the presence of highly sophisticated active noise reduction systems in mobile phones, wind-noise may still be a problem when using a mobile phone outside in the free air.

US 2014287802 A1 disclose a mobile phone cover having a filter compartment positioned adjacent to a microphone on the mobile phone. The filter compartment comprises a sound filter (a porous body) configured to reduce sound received by the microphone opening due to moving air in front of the microphone.

Prior art solutions is dampening both wind induced noise and the audible sound waves of interest. Prior art tends to solve this problem by increasing the gain of the amplifiers receiving microphone signals. However, this is also known to increase parts of wind induced noise that is not stopped by the sound filter, for example when dressing a microphone with a porous member.

According to an aspect of the present invention, a mobile cover according to the present invention may stop wind induced noise, but is also capable of letting audible sound waves of interest to pass with less loss of audible sound wave power.

Therefore, there is a need of an improved passive wind-noise reduction system that can be used in mobile phones, and especially to a passive noise reduction system that is beneficial to use together with an active noise reduction system.

OBJECT OF THE INVENTION

In particular, it may be seen as an object of the present invention to provide a mobile phone cover comprising at least one body of a porous material held in place in a waveguide like channel in front of microphone input openings of the mobile phone when the cover is mounted onto the mobile phone.

It is a further object of the present invention to provide an alternative to the prior art.

SUMMARY

Thus, the above described object and several other objects are intended to be obtained in a first aspect of the invention by providing a mobile phone cover providing passive noise reduction of at least one microphone audio input signal, comprising:

the mobile phone cover comprises a supporting frame having an outer periphery side face running around a periphery of a mobile phone housing when mounted onto the mobile phone, the periphery side face has an upper outer end surface, and an first outer lower end surface, wherein the mobile phone cover is arranged with an extension element extending out form the first outer lower end surface of the supporting frame, thereby providing a second lower end surface of the supporting frame running in parallel with the first outer lower end surface, the parallel first and second end surfaces defines an inner compartment in between the supporting frame and the first and second end surfaces, an upper surface of the compartment faced upwards towards a display side of the mobile phone when mounted is at least partly open while a bottom side of the compartment located opposite the partly open upper surface of the compartment is covered, wherein a body of a porous material is arranged filling the compartment and being located adjacent to at least one microphone opening arranged on an end surface of the mobile phone housing adjacent to the compartment when the cover is mounted.

FIGURES

The mobile phone cover according to the present invention will now be described in more detail with reference to the accompanying figures. The figures illustrates examples of embodiments of the present invention and is not to be construed as being limiting to other possible embodiments falling within the scope of the attached claim set. Further, respective examples of embodiments may each be combined with any of the other examples of embodiment.

DETAILED DESCRIPTION

Although the present invention has been described in connection with the specified embodiments, it should not be construed as being in any way limited to the present examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference sign in the claims with respect to elements indicated in the figures shall also not be construed as limiting to the scope of the invention. Furthermore, individual features mentioned in different claims, may possibly be advantageously combined, and the mentioning of these features in different claims does not exclude that a combination of features is not possible and advantageous.

The present disclosure is related to a passive noise reduction system comprising at least a mobile phone cover. Mobile phone covers are normally used to provide increased mechanical integrity of mobile phone housings, and to protect a larger display surface of smart phones usually made of glass.

Figure 1:
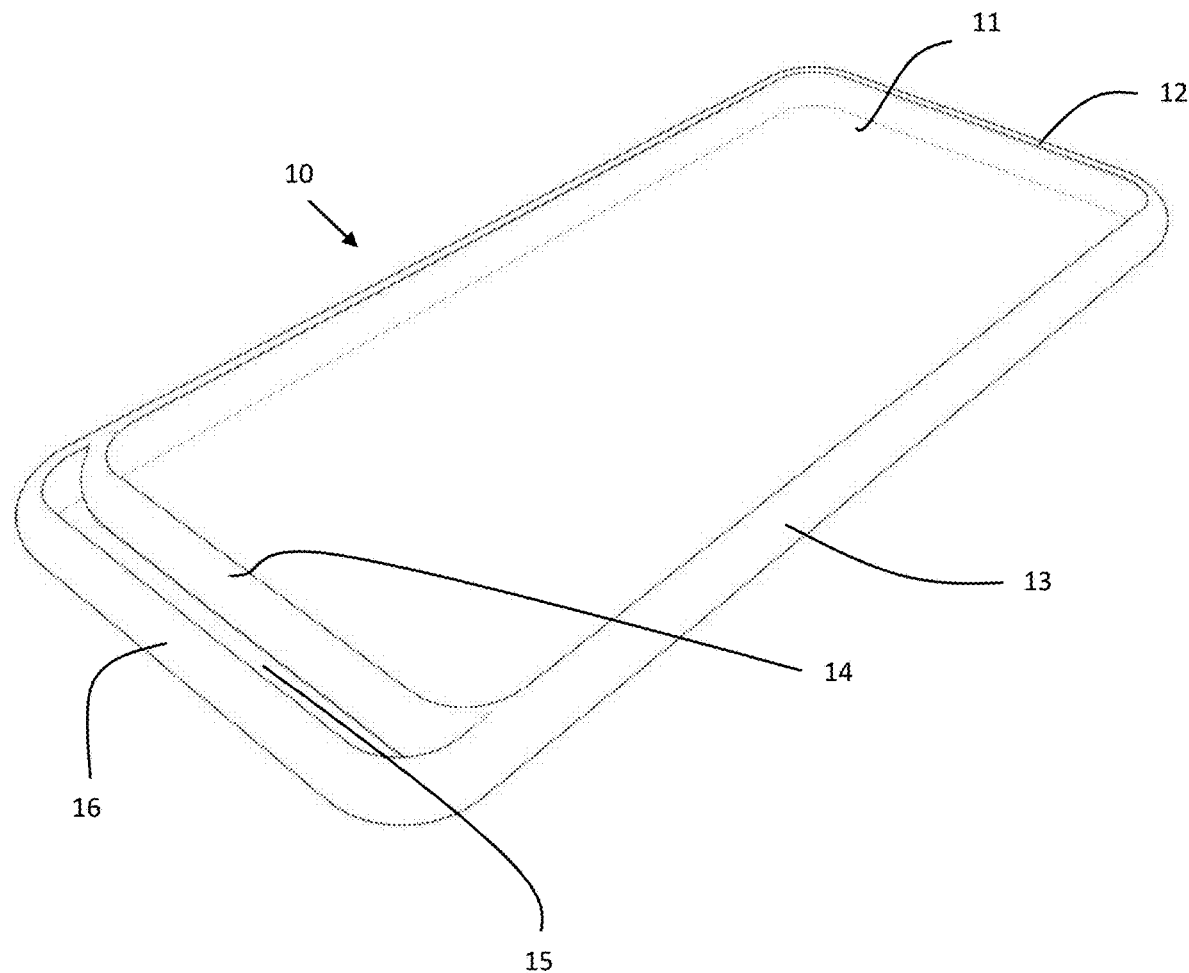
FIG. 1 illustrates an example of embodiment of the present invention.

An example of a mobile phone cover according to the present invention is illustrated in FIG. 1. The example of embodiment in FIG. 1 illustrate a mobile phone cover 10 comprising a supporting frame 13 having a peripheral side face running around a mobile phone housing when mounted. The cover 10 is configured to be pulled over the circumference of the mobile phone housing thereby mounting the supporting frame 13 onto the mobile phone. In this example of embodiment, the backside 11 is open, i.e. there is no backside. Therefore, the mobile phone cover 10 can be attached to the mobile phone housing by pulling the cover onto the phone housing from a display side (i.e. front side) of the mobile phone housing. The display side will then be accessible for a user of the phone.

It is also within the scope of the present invention that the supporting frame 13 may have a cover covering the whole backside, or just a part of the backside, for example comprising a stiff back side plate increasing the mechanical integrity of the mobile phone housing. Then the mobile phone cover 10 can be attached to the cover by pressing the mobile phone housing with the mobile phone backside first into the supporting frame 13. The display side or front side of the mobile phone will be accessible for a user of the phone The supporting frame 13 is in either case firmly attached to the mobile phone housing due to a tight clearance between the inside side faces of the supporting frame 13 and the periphery sides of the mobile phone housing. A specific supporting frame 13 is adapted in size (and may be appearance) to a specific mobile phone model. Different sized supporting frames 13 can be adapted to other respective mobile phone models.

The peripheral side face of the supporting frame 13 is running around the outer periphery of the mobile house when mounted. The peripheral side face has an upper periphery side surface 12 and a first bottom periphery side face 14. An extension of the supporting frame 13 is arranged as an extension of the cover 10 out from the first bottom periphery side face 14, which ends in a second bottom periphery side surface 16 running in parallel with the first bottom periphery side face 14, i.e. both the first and the second bottom periphery side faces 14, 16 are running in parallel with the bottom periphery side of the mobile phone. In between the first and second bottom periphery side surfaces 14, 16 there is constituted an empty compartment 15. The backside of the cover 10 can be open or be arranged with a plate as discussed above. In any case, the bottom of the compartment 15 is always covered with a plate while the front side of the compartment 15 faced upwards on a same side as the front side (display side) of the mobile phone is at least always partly open, i.e. a part of the opening of the front side of the compartment 15 may be partly covered, but always a part of the front side of the compartment 15 is not covered.

When a mobile phone with a mobile phone cover 10 according to the present invention is in use, the upper periphery side surface 12 is located close to the ear of the mobile phone user while the compartment 15 is located close to the mouth of the mobile phone user. It is common to have at least one microphone located on the bottom end surface of the mobile phone housing since this part is close to the mouth of a user of the phone. Therefore, the at least one microphone of the mobile phone will be located inside the compartment 15 of the extension to the mobile phone cover 10.

Figure 2:
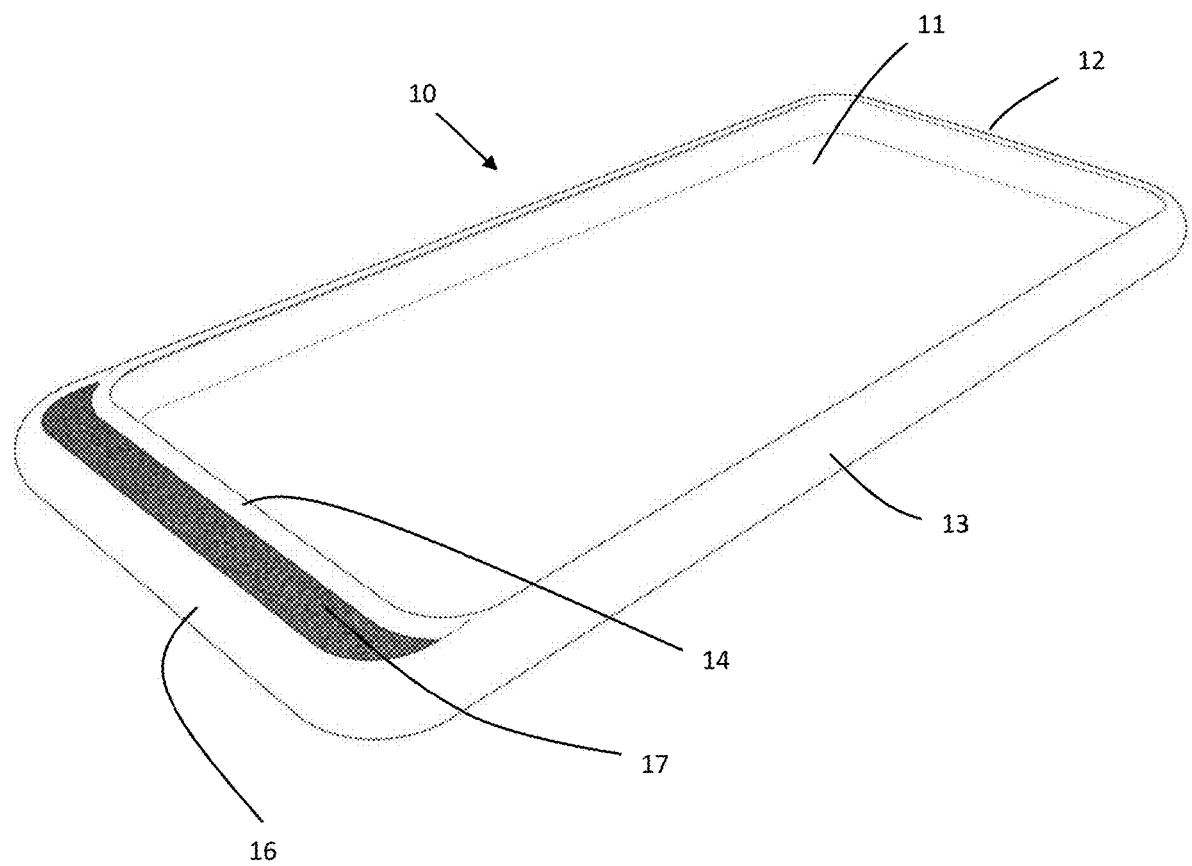
FIG. 2 illustrates further details of the example in FIG. 1.
Figure 3:
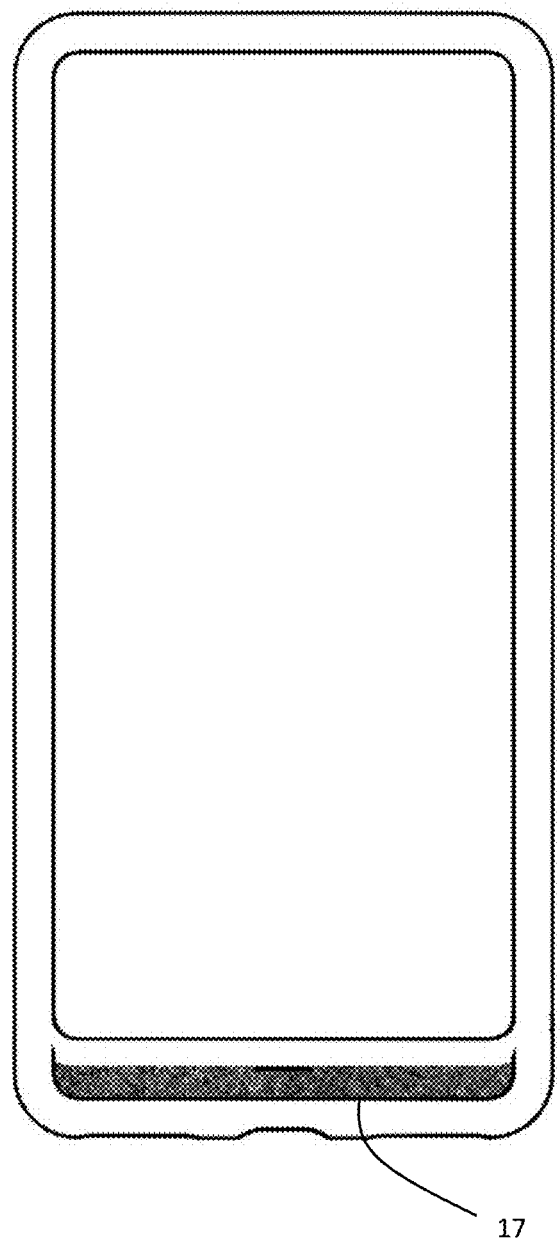
FIG. 3 illustrates the example of embodiment in FIG. 2 viewed from another perspective.

In FIG. 2, the compartment 15 of FIG. 1 is filled or arranged with a body 17 made of a porous material. For example a sponge like material or foam rubber. The purpose of the porous body 17 is to mitigate the effect of wind-noise as discussed above. FIG. 3 depicts the example of embodiment in FIG. 2 viewed from above.

Figure 4:
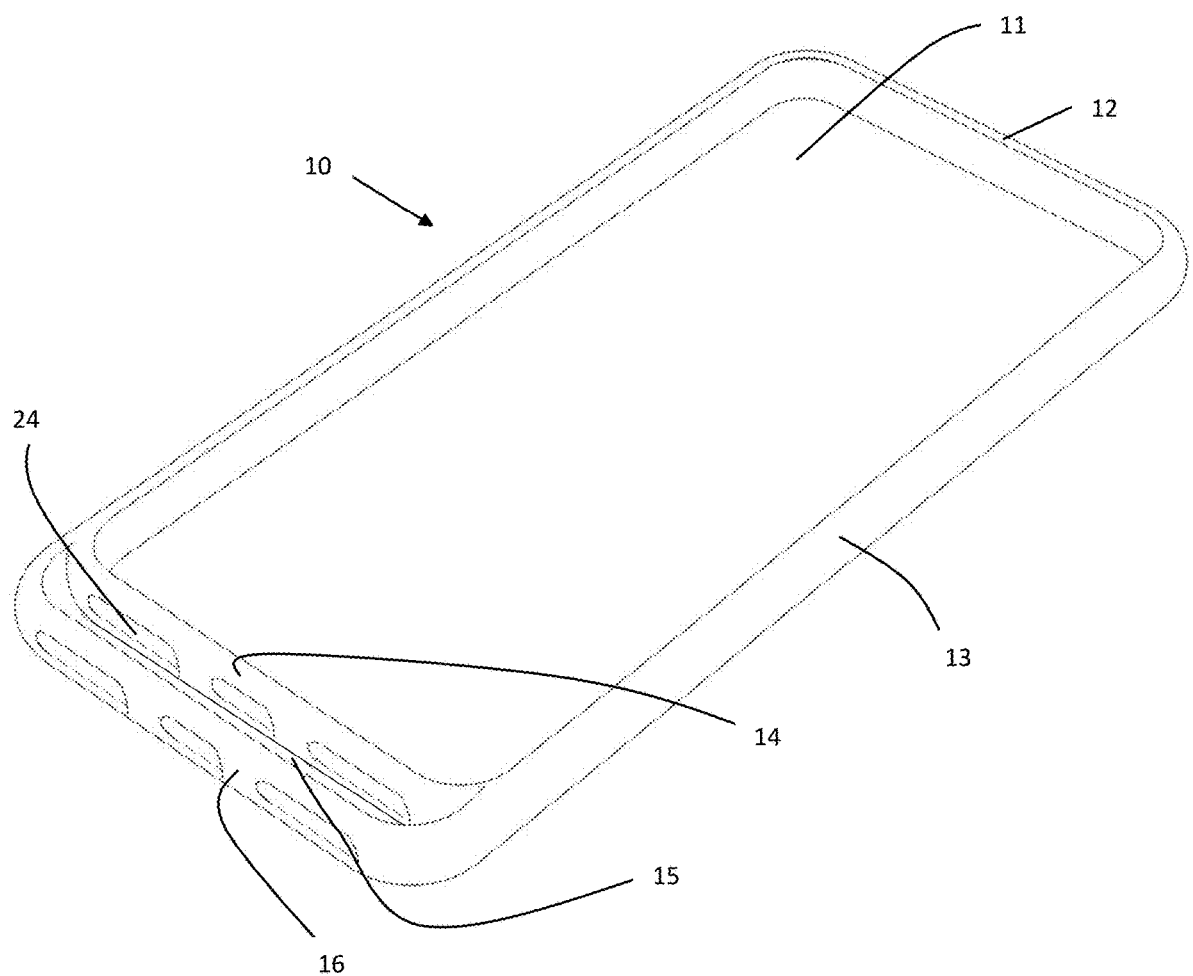
FIG. 4 illustrates a further example of embodiment of the present invention.

In FIG. 4, the first bottom end surface 14 of the supporting frame 10 as disclosed in FIG. 2 and FIG. 3 is arranged with some defined openings. The locations of these openings are correlated with corresponding located loudspeaker openings and/or microphone openings arranged on the bottom end surface of the mobile phone housing. The second bottom end surface 16 is also arranged with openings corresponding with the openings on the first bottom end surface 14.

Figure 5:
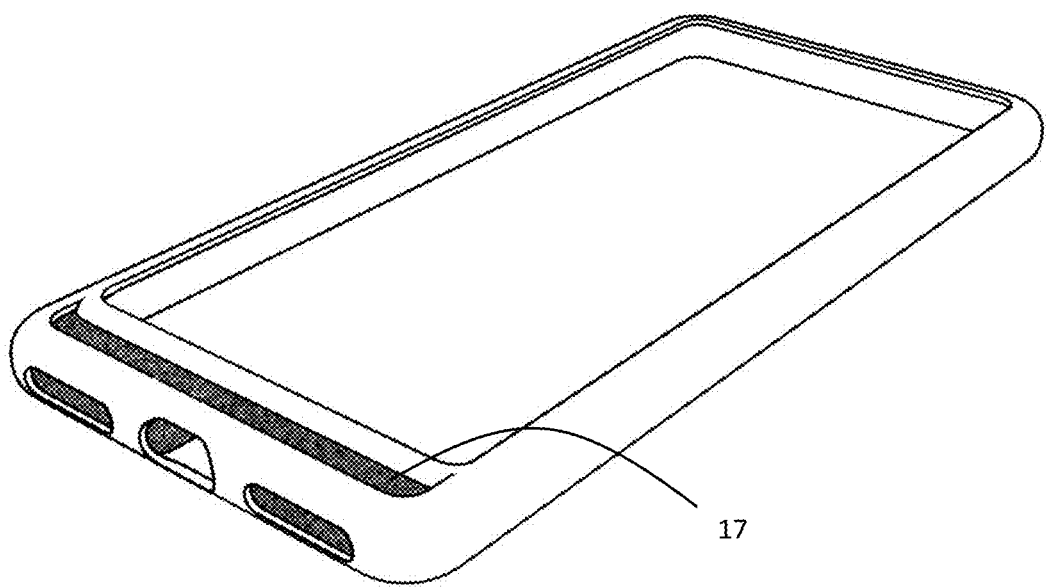
FIG. 5 illustrates further details of the example of embodiment illustrated in FIG. 4.

FIG. 5 illustrate a perspective view of the example of embodiment in FIG. 4, wherein a body 17 comprising a porous material is located inside the compartment 15 as discussed above.

Figure 6A:
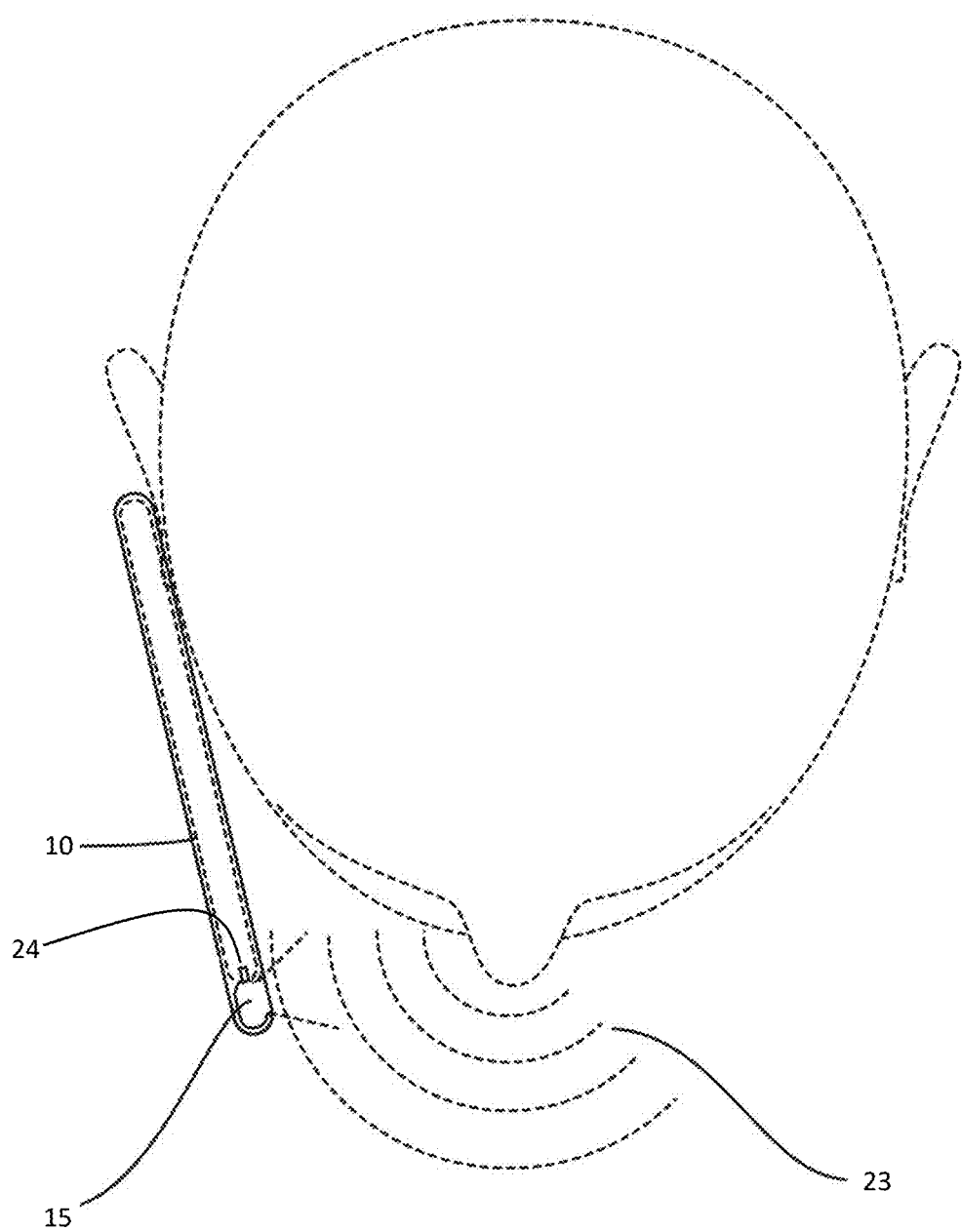
FIG. 6a illustrates use of an example of embodiment of the present invention

FIG. 6a illustrates how soundwaves 23 form a human mouth is propagating through space from the mouth to towards the compartment 15. The sound waves 23 will partly enter the compartment 15 through the front side opening of the compartment 15 facing towards the mouth of the user. A microphone opening 24 of the phone-cover is located adjacent to the compartment 15 on the bottom end surface of the mobile phone housing. With reference to FIGS. 4 and 5, it may also be arranged cut-outs on the first and second bottom periphery side surfaces 14, 16 corresponding with the microphone positions on the bottom periphery end surface of the mobile phone housing.

Figure 6B:
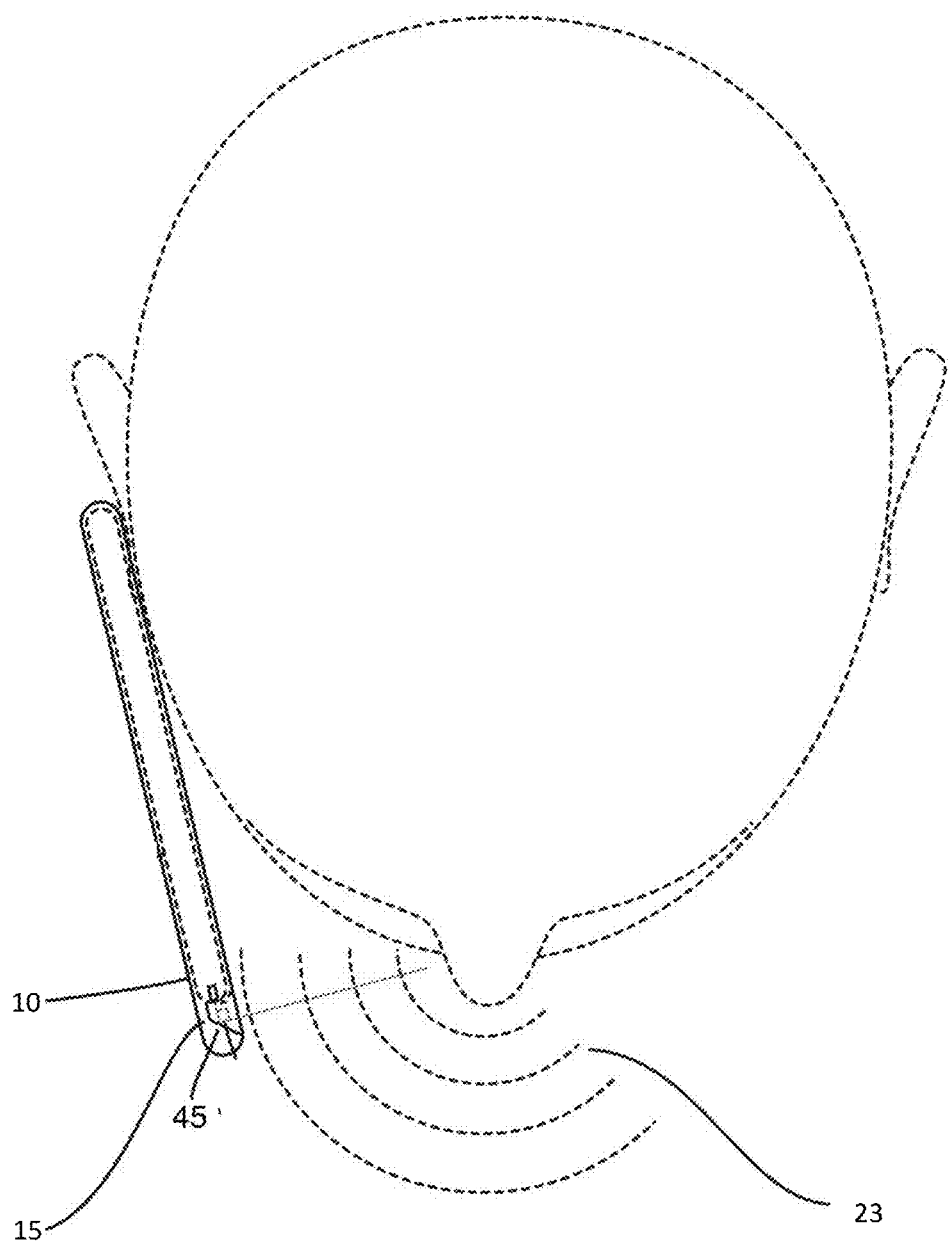
FIG. 6b illustrates use of another example of embodiment of the present invention.

FIG. 6*b* illustrate how the bottom surface of the compartment 15 can be arranged with a 45° inclination angel from the bottom of the cover 10. The effect is that incoming sound waves will be reflected towards the microphone openings on the mobile phone housing as illustrated in the figure.

The inventor has performed several test of exemplary embodiments of the present invention.

The purpose has been to identify how well wind induced noise is reduced or mitigated by a cover according to the present invention. The porous body 17 stops or mitigate wind induced noise as discussed above. At the same time the porous body 17 let audible sound waves pass through the pores of the porous media. In addition, the compartment 15, as depicted in FIGS. 1 to 5, constitutes a wave guide like channel from the open front surface of the compartment 15 towards a microphone opening located on the bottom periphery side surface of the mobile phone housing.

The testing was performed on an iPhone XS Max™ and a Samsung S10+™ with approximately the same results. The sound source used in the measurements was a Tivoli Pal radio and a frequency sweep generator. The Tivoli Pal radio has a single membrane speaker, having no phase issues between bass and treble. The frequency response is uneven, but only relative differences were to be measured, thereby compensating uneven frequency responses. The sound received by the phone was measured at a loudspeaker of the phone.

Figure 7:
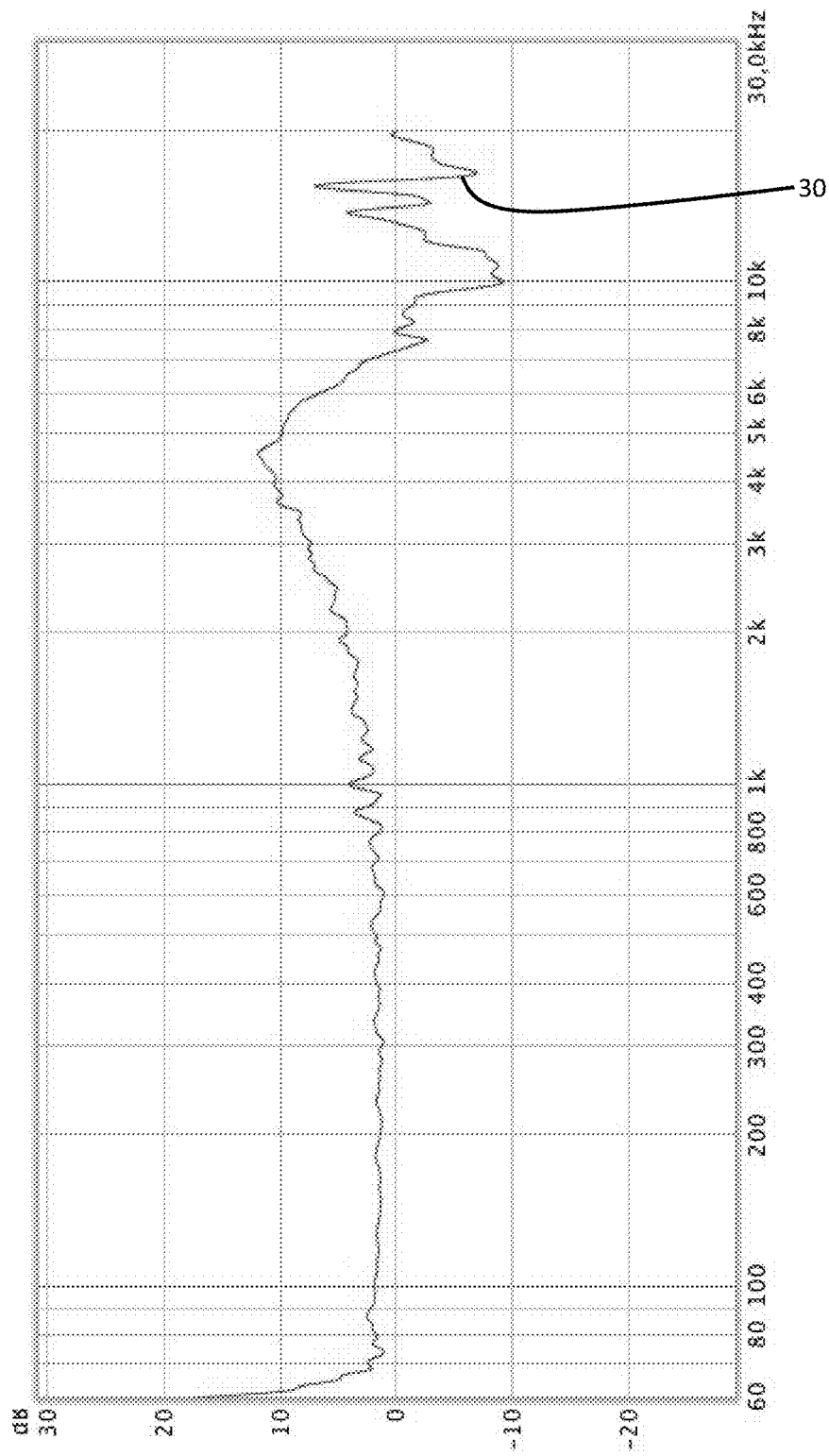
FIG. 7 illustrates an example of a performance measurement of an example of embodiment of the present invention.

FIG. 7 illustrate a measurement of the effect of a cover 10 according to the present invention wherein the compartment 15 is empty and the cover is as illustrated in FIG. 6*a*.

FIG. 7 illustrates the result of using an iPhone XS Max™ wherein the compartment 15 was empty and a frequency sweep from 60 Hz to 30.0 kHz was provided by sound from the connected Tivoli Pal radio. Normal human speech is in the frequency range from about 1 kHz to around 4.5 kHz.

The curve 30 in FIG. 7 reveals the wave guide like performance of the channel constituted by the compartment 15. The sound amplitude increased in general with one dB across the whole frequency range, and especially providing a significant increase inside the frequency range of normal human speech.

Clarity of speech is also an important factor when evaluating the effect of the present invention. In a measurement setup the test standard C50 was used to estimate clarity of speech with and without the cover 10 mounted, and wherein the compartment 15 was empty, i.e. without the porous body 17.

C50 tests compares the sound energy in early sound reflexes with those arriving later. It is expressed in dB and a high value is positive for speech clarity. The test is standardized and is available as ISO 3382-1.

Figure 8:
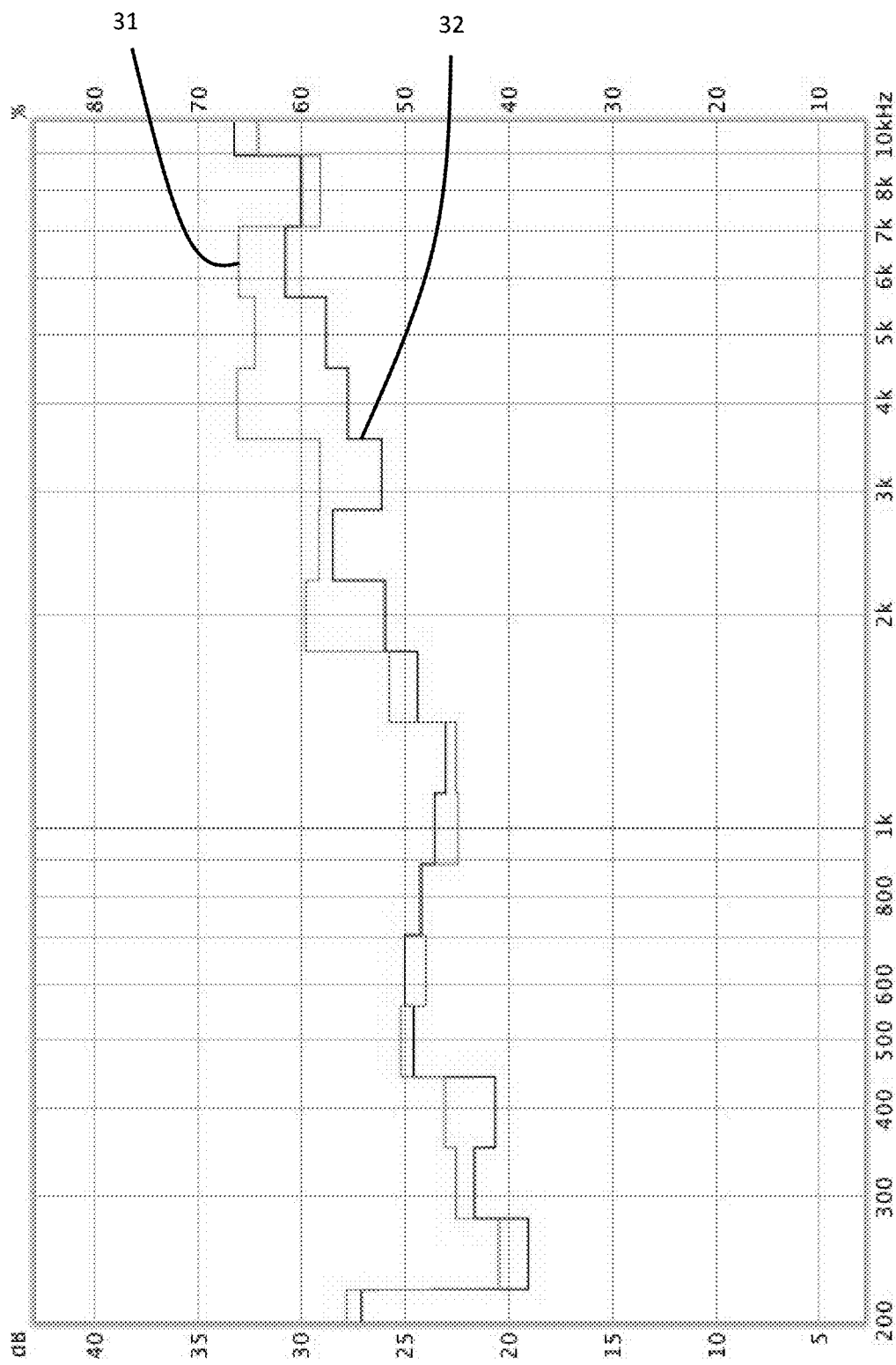
FIG. 8 illustrates another example of a performance measurement of an example of embodiment of the present invention.

FIG. 8 illustrates a relative measurement of C50 results. The graph 31 depicts the results with cover 10 mounted while the graph 32 depicts the results without the cover 10 mounted. A sound sweep was performed between the frequencies 200 Hz to 10 kHz via the Tivoli Pal radio.

The measurements illustrated in FIGS. 7 and 8 illustrates the fact that the cover itself enhance the sound received via the compartment 15, which is not only louder, but also clearer.

Figure 9:
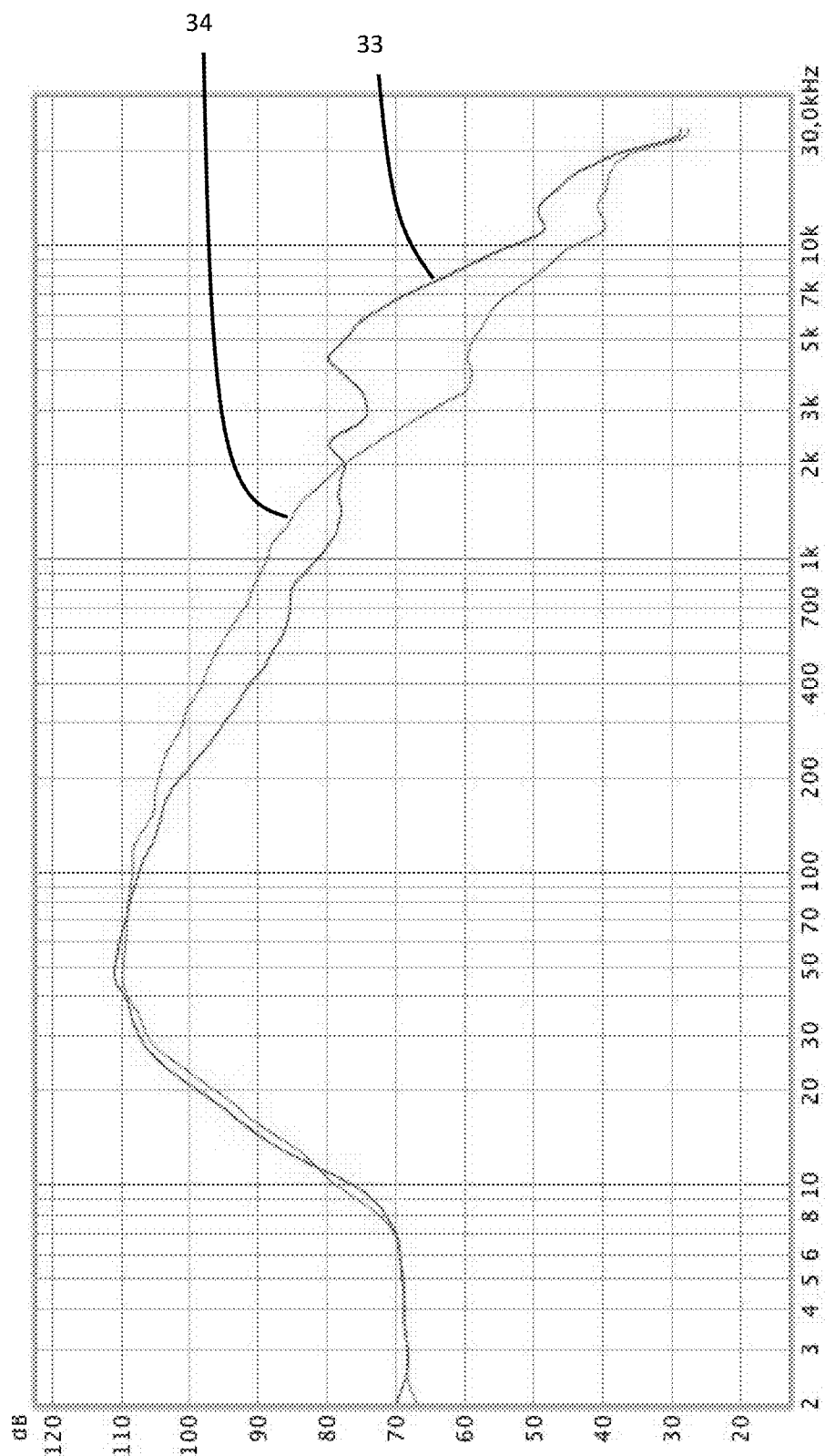
FIG. 9 illustrates another example of a performance measurement of an example of embodiment of the present invention.
Figure 10:
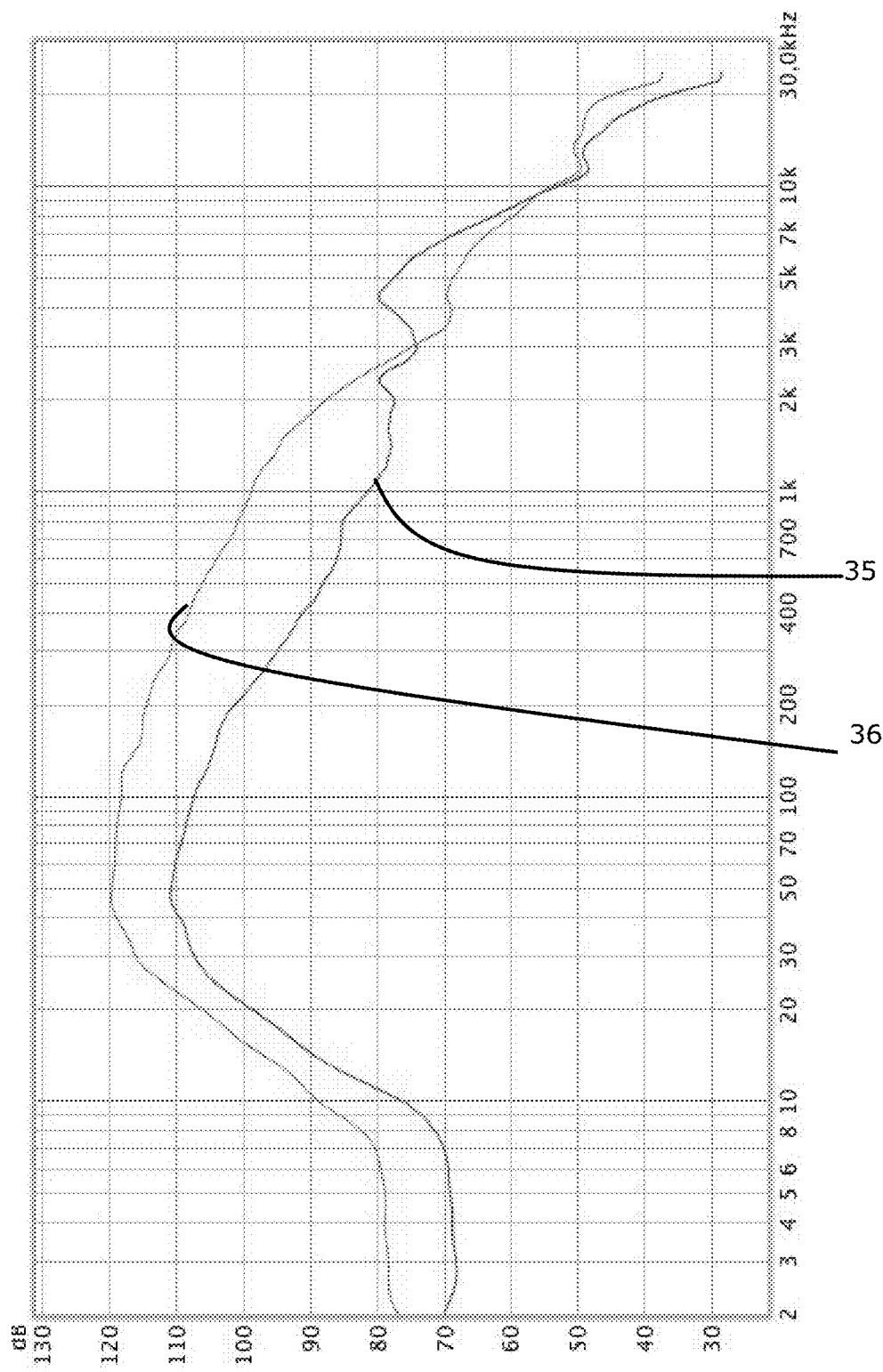
FIG. 10 illustrates another example of a performance measurement of an example of embodiment of the present invention.

The effects of arranging a porous body 17 in the compartment 15 is illustrated in FIGS. 9 and 10.

FIG. 9 illustrate a situation without the cover 10 mounted, and measured with wind as illustrated in graph 33, and without wind illustrated in graph 34.

The wind effect was generated with a fan. The apparent increase of wind noise after 2 Khz is not wind noise, but the noise of the fan itself. This is most likely due to compression done by the phone itself, making the fan noise as well as the loudness of sweep measurements quieter in wind relative to a situation without wind. Compression is a process which attenuates beyond a certain threshold resulting in a lesser difference between loud and quiet sounds, hence if the sweep is quieter than before within the same measurement parameters, the total of the signal has been attenuated by an amount equal to or close to the reduction of the sweep level. To adjust for this compression, the sweep measurement was used as a reference. The measurements indicated that the sweep was about 10 dB quieter when wind is added. The relative wind noise adjusted with 10 dB is depicted in FIG. 10. The compensated measurements indicate a difference of 14 to 17 dB with and without the cover comprising a porous body 17 mounted in the compartment 15. It is probable that the cover 10 do not affects everything below 100 Hz, but in the upper frequency region this will be true.

Figure 11:
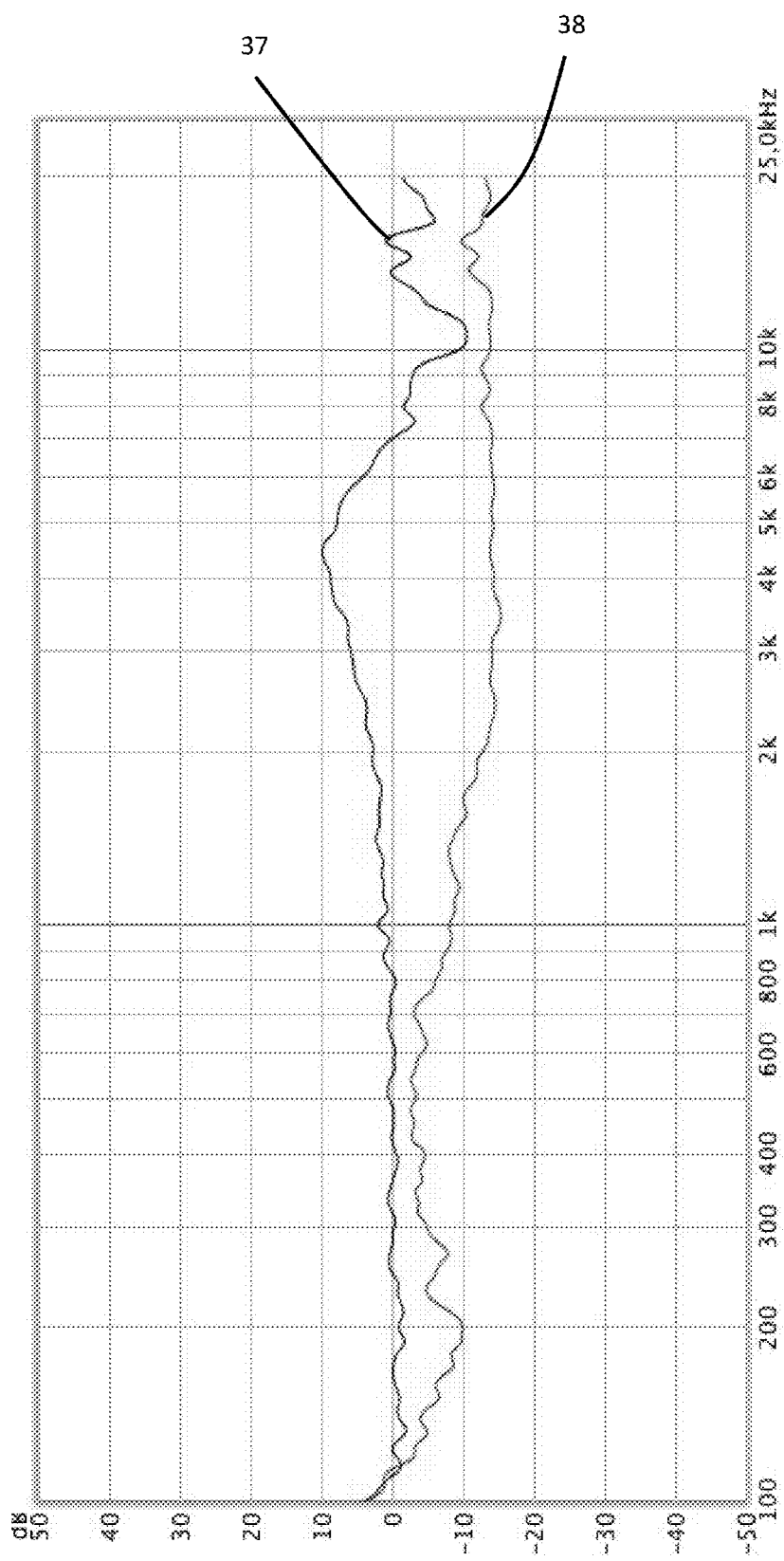
FIG. 11 illustrates another example of a performance measurement of an example embodiment of the present invention.

FIG. 11 illustrates a measurement of the frequency response in wind with the cover on and without the cover. The graph 37 is the result obtained with the cover mounted while the graph 38 illustrate the results without the cover 10 mounted on the phone.

The graphs illustrates that around t 2 KHz and above there is a reduction of 14 dB relative to a situation wherein the cover is not mounted, and 14-24 dB relative to a situation wherein the cover is mounted when there is wind blowing. This means that with the cover 10 mounted the amount of desired sound passing through is significantly higher than without the cover present.

The first lower end surface (14) of the supporting frame (10) may be constituted by a material having an adapted acoustic impedance adapted to a typical range of frequencies of speech from humans. Thereby speech can pass the material of the end surface (14) of the supporting frame (10) onto the at least one microphone without attenuation, or at least with minimal attenuation. The same material may also be used in the extension element (16) of the supporting frame (13).

Figure 12:
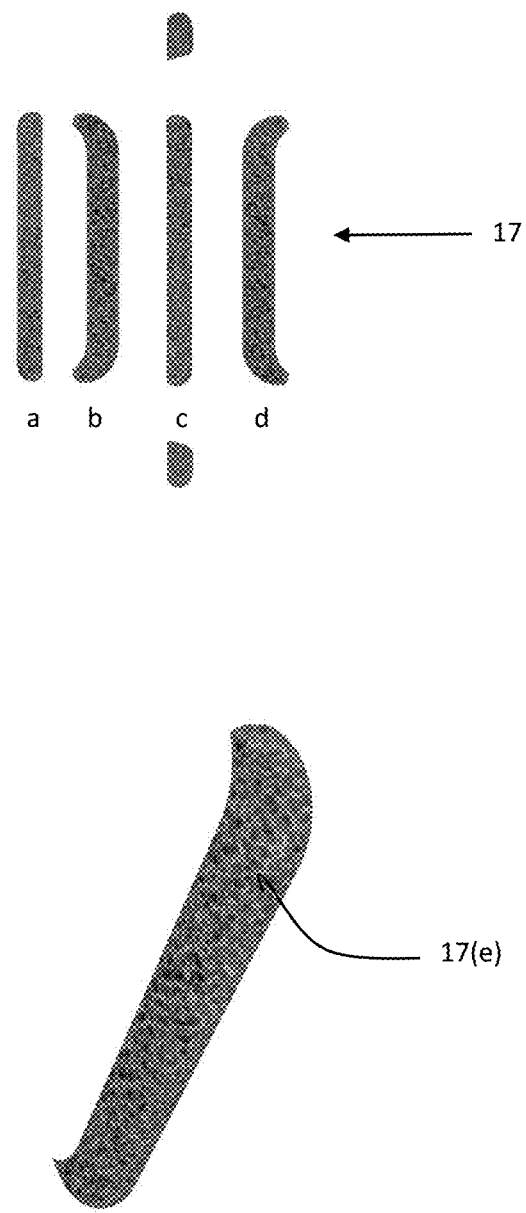
FIG. 12 illustrates possible shapes of a noise reduction element according to the present invention.

FIG. 1 and FIG. 2 illustrate an example of a supporting frame 13, with a non-limiting specific shape of the porous body 17. FIG. 12 illustrates some examples of possible shapes of the porous body 17 that is adapted to shapes of different examples of the space 15 defined by the extension element 16 and the end surface 14 of the supporting frame 13. Illustration 17(*a*), illustration 17(*b*), illustration 17(*c*) and illustration 17(*d*) illustrates different shapes of the body 17 viewed from above. Illustration 17(*e*) is a perspective view of the body illustrated in 17(*b*), which is the same shape of the body 17 used in the examples illustrated in FIG. 2 and FIG. 3.

Figure 13:
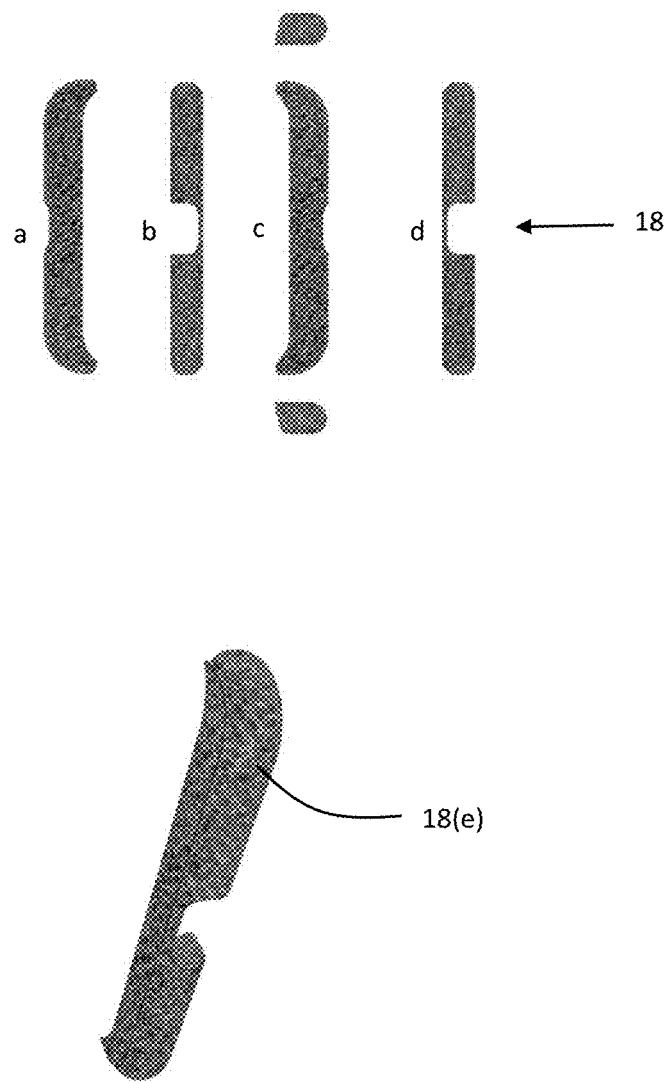
FIG. 13 illustrates further possible shapes of a noise reduction element according to the present invention.

FIG. 13 illustrates other examples of embodiments of a porous body 18. In these examples, a cut-out in the centre of the body 18 is adapted to enable connection of a power cable for example to the mobile phone housing. Corresponding openings are then arranged in the side face of the extension element 16 and in the first bottom end surface 14 of the original supporting frame 13. Illustration 18(*b*) and illustration 18(*d*) illustrates the porous body 18 seen from the side of the body 18, while illustration 18(*a*) and illustration 18(*c*) illustrates the body 18 viewed from the top side of the body 18. Illustration 18 (*e*) is a perspective view of the example of embodiment of the porous body 18(*a*).

It is further within the scope of the present invention that microphones may be arranged on any of the side faces of the mobile phone housing including the side of the housing comprising the display (microphones may be located at edges of the display surface), and the backside opposite the display side. It is further within the scope of the present invention to provide a mobile phone cover comprising at least a supporting frame 13 that may comprise adapted cut-outs in the side faces of the frame 13 coinciding with openings of respective microphones. Further, microphones located on the display side, and/or on the backside, of the mobile phone may be covered by an extension of the cover stretching above the part of the display surface (in the edge regions of the display surface) and/or on the backside of the mobile phone housing. Cut-outs over the locations of respective microphones can be arranged with a material like the materials used for the porous bodies 17, 18 as discussed above.

Figure 14:
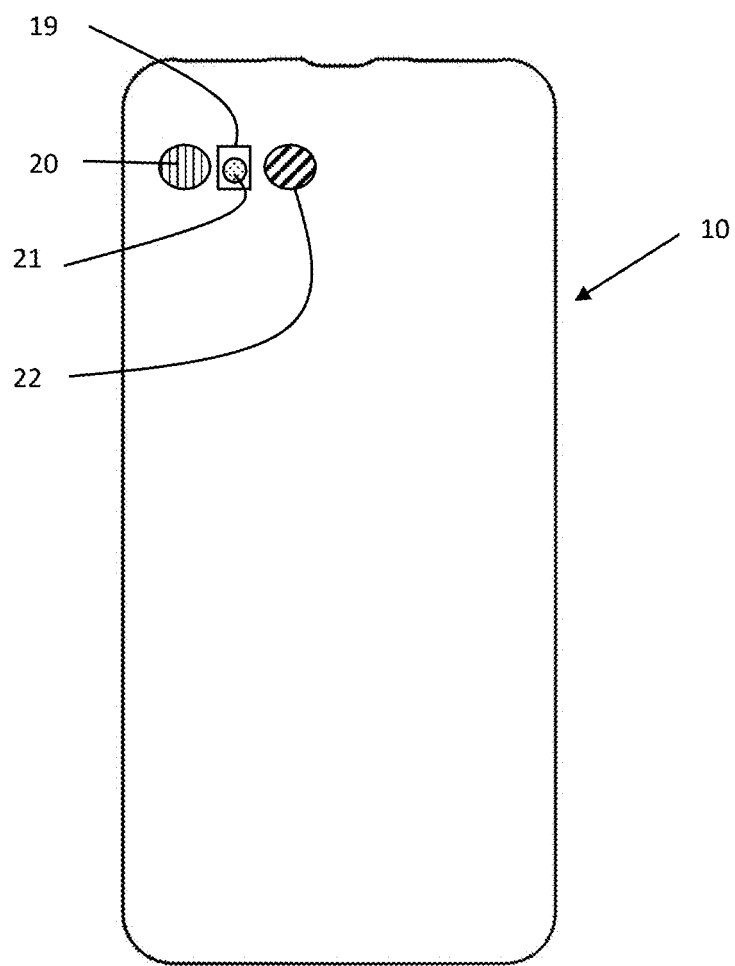
FIG. 14 illustrates an example of embodiment of the present invention.

FIG. 14 illustrates an example of a backside of the supporting frame 13 having a cut-out 20 above a camera lens of the mobile phone, a cut-out 21 above a microphone of the mobile phone, and a cut-out 22 for a LED based flashlight. Around the cut-out 21 above the microphone, there is a frame 19 arranged around the cut-out 21 providing support for a body of a porous media as discussed above (not illustrated). Then wind induced noise is also reduced for this specific microphone.

For example, an iPhone 7 from Apple™ as discussed above has a microphone located in between the LED providing flashlight and the camera opening of the phone. Then an extension of the supporting frame 13 may be arranged stretching down from the upper edge 12 comprising cut outs for the camera and the LED based flashlight in addition to a cut out over the microphone comprising a body of a porous media without necessarily covering the whole backside of the mobile phone housing.

SP Technical Research Institute of Sweden has also conducted experiments establishing the effect on the reduction of wind noise using porous materials like sponge like materials and/or foam rubber materials. The report dated 17 Jan. 2017 has the identification number 6P09044Rev1.

The investigation measured noise sound pressure differences between a situation without a wind noise reducing material and a situation with the noise reducing material. If the pressure is reduced, the impact on the membrane or diaphragm will be correspondingly decreased. i.e. less wind induced noise.

When the test wind had a speed of 2 m/s the reduction of the wind noise sound pressure was approximately 35%, and when the test wind had a speed of 8 m/s the reduction was 76%, and when the wind speed was 12 m/s the reduction was 71%. In the interval between 4 m/s and 8 m/s of wind speed, the reduction was on average 74%.

The invention claimed is:

1. A mobile phone cover comprising:
a supporting frame having an outer periphery side face configured to run around a periphery of a housing of a mobile phone when the cover is mounted onto the mobile phone, the outer periphery side face of the supporting frame has an upper periphery side surface and a first bottom periphery side surface, the first bottom periphery side surface having at least one microphone opening aligned with a microphone opening in the mobile phone housing when the cover is mounted onto the mobile phone;
an extension element extending from the first bottom periphery side surface of the supporting frame, the extension element including a second bottom periphery side surface and a bottom cover member, the second bottom periphery side surface being parallel to the first bottom periphery side surface of the supporting frame such that the first bottom periphery side surface, the second bottom periphery side surface and the bottom cover member define a compartment with an open front side extending from a first periphery side face of the outer periphery side face of the supporting frame to a second periphery side face of the outer periphery side face of the supporting frame; and
a body made of a porous material positioned within the compartment between the open front side and the at least one microphone opening;
wherein the open front side of the compartment is located above the at least one microphone opening such that at least a portion of the compartment from the open front side to the at least one microphone opening constitutes a waveguide like channel, and wherein the waveguide like channel and the porous material of the body provides an improved measure of clarity of speech of soundwaves passing from the open front side of the compartment through the porous material body towards the at least one microphone opening.

2. The mobile phone cover of claim 1, wherein at least the first bottom periphery side surface of the supporting frame is constituted by a material having an adapted acoustic impedance adapted to a typical range of frequencies of speech signals from humans.

3. The mobile phone cover of claim 1, wherein the extension element of the supporting frame is constituted by a material having an adapted acoustic impedance adapted to a typical range of frequencies of speech signals from humans.

4. The mobile phone cover of claim 1, wherein at least one cut-out is arranged on a location on the first lower end surface of the supporting frame coinciding with the location of the at least one microphone input opening on the mobile phone housing.

5. The mobile phone cover of claim 1, wherein at least one cut-out is arranged on a location on the second end surface of the supporting frame coinciding with the location of the at least one microphone input opening on the mobile phone housing.

6. The mobile phone cover of claim 1, wherein the supporting frame has an open backside.

7. The mobile phone cover of claim 1, wherein the supporting frame has a covered, or partly covered backside constituted by a stiff material.

8. The mobile phone cover of claim 7, wherein the covered backside has at least one cut-out located above the microphone opening on the mobile phone housing when the cover is mounted onto the mobile phone housing.

9. The mobile phone cover of claim 8, wherein a frame is arranged around the cut-out over the microphone opening location holding a body made of a porous material.

10. The mobile phone cover of claim 9, wherein the porous material comprises foam rubber or a sponge like material.

11. The mobile phone cover of claim 7, wherein the stiff material comprises a steel plate.

12. The mobile phone cover of claim 1, wherein the porous material comprises a foam rubber or a sponge like material.

13. A mobile phone cover comprising:
a supporting frame configured to receive a housing of a mobile phone when the cover is mounted onto the mobile phone, the supporting frame including two side surfaces, an upper side surface and a bottom side surface, wherein one of the side surfaces includes at least one microphone opening aligned with a microphone opening in the mobile phone housing when the cover is mounted onto the mobile phone;

an extension element extending from the side surface of the supporting frame having the at least one microphone opening, the extension element including an extension side surface and a bottom cover member, the extension side surface being parallel to the side surface of the supporting frame having the at least one microphone opening such that the side surface of the support frame having the at least one microphone opening, the extension side surface and the bottom cover member define a compartment with an open front side extending from a first periphery side face of the outer periphery side face of the supporting frame to a second periphery side face of the outer periphery side face of the supporting frame; and a body made of a porous material positioned within the compartment between the open front side and the at least one microphone opening in the side surface of the supporting frame;

wherein the open front side of the compartment is located above the at least one microphone opening in the side surface of the supporting frame such that at least a portion of the compartment from the open front side to the at least one microphone opening in the side surface of the supporting frame constitutes a waveguide like channel, and wherein the waveguide like channel and the porous material of the body provides an improved measure of clarity of speech of soundwaves passing from the open front side of the compartment through the porous material body towards the at least one microphone opening in the side surface of the supporting frame.

14. The mobile phone cover of claim 13, wherein the bottom side surface of the supporting frame includes the at least one microphone opening aligned with the microphone opening in the mobile phone housing when the cover is mounted onto the mobile phone.

15. The mobile phone cover of claim 13, wherein the supporting frame has an open backside.

16. The mobile phone cover of claim 13, wherein a backside of the supporting frame is covered or partly covered.

17. The mobile phone cover of claim 16, wherein the cover on the backside of the supporting frame is made of a stiff material.

18. The mobile phone cover of claim 17, wherein the stiff material comprises a steel plate.

19. The mobile phone cover of claim 13, wherein the porous material comprises foam rubber or a sponge like material.

* * * * *